(12) United States Patent
Ebitani

(10) Patent No.: US 8,279,469 B2
(45) Date of Patent: Oct. 2, 2012

(54) IMAGE FORMING APPARATUS, IMAGE FORMING METHOD AND RECORDING MEDIUM STORING PRINTING CONTROL PROGRAM

(75) Inventor: Kenji Ebitani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 951 days.

(21) Appl. No.: 11/936,419

(22) Filed: Nov. 7, 2007

(65) Prior Publication Data

US 2009/0002747 A1    Jan. 1, 2009

(30) Foreign Application Priority Data

Jun. 28, 2007    (JP) ................... 2007-170404

(51) Int. Cl.
G06F 3/12    (2006.01)
G06K 15/00    (2006.01)

(52) U.S. Cl. ..................... 358/1.15; 358/1.14

(58) Field of Classification Search .................. None
See application file for complete search history.

(56) References Cited

U.S. PATENT DOCUMENTS

| | | | |
|---|---|---|---|
| 6,160,629 A * | 12/2000 | Tang et al. | 358/1.1 |
| 2002/0131059 A1* | 9/2002 | Tsuchitoi | 358/1.1 |
| 2004/0213615 A1* | 10/2004 | Nakao | 400/76 |
| 2005/0275866 A1* | 12/2005 | Corlett | 358/1.14 |

FOREIGN PATENT DOCUMENTS

| | | |
|---|---|---|
| JP | A-11-53314 | 2/1999 |
| JP | A 2003-182187 | 7/2003 |
| JP | A-2003-228262 | 8/2003 |
| JP | A 2005-1155 | 1/2005 |
| JP | A 2005-244656 | 9/2005 |
| JP | A 2005-335282 | 12/2005 |
| JP | A 2006-27083 | 2/2006 |
| JP | A-2006-163934 | 6/2006 |

OTHER PUBLICATIONS

Office Action issued on Sep. 27, 2011 in corresponding Japanese Application No. 2007-170404. (with English language translation).

* cited by examiner

*Primary Examiner* — Marivelisse Santiago Cordero
*Assistant Examiner* — Mesfin Getaneh
(74) *Attorney, Agent, or Firm* — Oliff & Berridge, PLC

(57) ABSTRACT

An image forming apparatus, which includes: a printing data reception section that receives printing data through a communication section; a printing data storage section that stores the printing data and authentication information added to the printing data in association with each other; a printing section that prints the printing data on a printing medium; an information reception section that receives information; a matching section that matches the information with the authentication information; a retrieval section that retrieves the printing data processable based on matched first information; a presentation section that provides a list of the retrieved printing data; and a permission section that, when, while the list of printing data is being provided, the reception section receives an instruction to print the printing data and second information, and the instructed printing data is included in the printing data processable based on the second information, permits printing the printing data.

11 Claims, 8 Drawing Sheets

IMAGE FORMING APPARATUS, IMAGE FORMING METHOD AND RECORDING MEDIUM STORING PRINTING CONTROL PROGRAM

CROSS-REFERENCE TO RELATED APPLICATION

This application is based on and claims priority under 35 USC 119 from Japanese Patent Application No. 2007-170404 filed on Jun. 28, 2007.

BACKGROUND

Technical Field

The present invention relates to an image forming apparatus, an image forming method and a recording medium storing a printing control program.

SUMMARY

An aspect of the present invention provides an image forming apparatus, which includes: a printing data reception section that receives printing data through a communication section; a printing data storage section that stores the printing data received by the printing data reception section and authentication information added to the printing data in association with each other; a printing section that prints the printing data on a printing medium; an information reception section that receives information, a matching section that matches the information received by the information reception section with the authentication information added to the printing data; a retrieval section that retrieves from the printing data storage section the printing data processable on the basis of first information matched by the matching section; a presentation section that provides a list of the printing data retrieved by the retrieval section; and a permission section that, in a case where, while the list of printing data is being provided by the presentation section, the reception section receives an instruction to print the printing data on the printing medium and second information, and the instructed printing data is included in the printing data processable on the basis of the second information matched by the matching section, permits printing of the instructed printing data on the printing medium.

BRIEF DESCRIPTION OF THE DRAWINGS

Exemplary embodiments of the present invention will be described in detail based on the following figures, wherein.

DETAILED DESCRIPTION

Hereinbelow, embodiments of the image forming apparatus, the image forming method and the recording medium storing the printing control program pertaining to the exemplary embodiment of the present invention will be described in detail with reference to the attached drawings.

Figure 1:
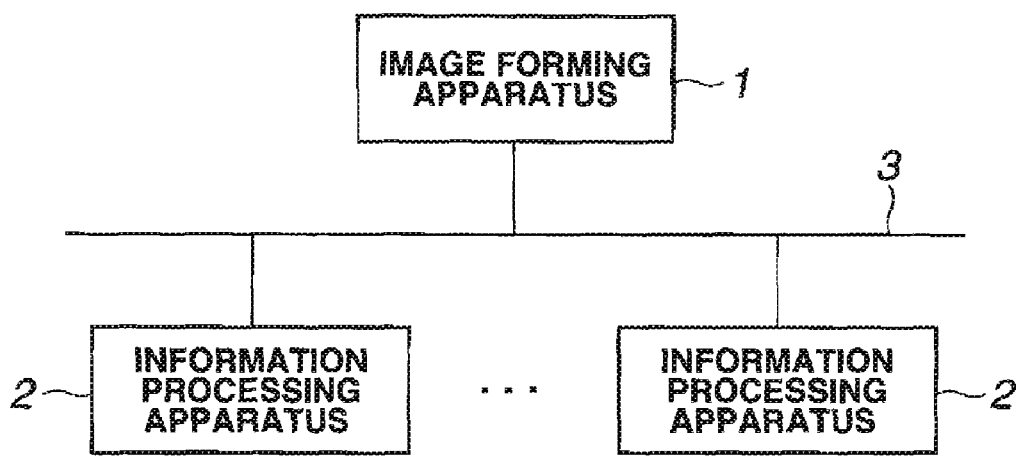
FIG. 1 is a diagram for explaining an outline of the exemplary embodiment of the present invention.

FIG. 1 is a diagram for explaining the outline of the exemplary embodiment of the present invention.

As shown in FIG. 1, an image forming apparatus 1 pertaining to the exemplary embodiment of the present invention, and at least one information processing apparatus 2 are connected to one another through a network 3.

Examples of the image forming apparatus 1 include a printer, a copying machine, and others which have an image forming function for forming a printing image on a printing medium (hereinafter to be referred to as a sheet of paper). The image forming apparatus 1 carries out a process (such as a printing process) for forming a printing image generated on a printing request (hereinafter to be referred to as printing data) in the format of the printer control code received from the information processing apparatus 2 through the network 3 on the sheet of paper. The image forming apparatus 1 temporarily stores printing data to which authentication information, such as a user ID (which may be an identifier which can be used by plural persons, such as a group ID), a password, or the like, is added, and when the pertinent authentication information is received, carries out printing processing of the pertinent printing data. Such printing processing is hereinafter to be referred to as confidential printing. The authentication information represents the authority for making processing operation on an object document, for example.

Examples of the information processing apparatus 2 include a personal computer, a mobile terminal, and the like, which are directly used by the user. The information processing apparatus 2 utilizes the printer driver function incorporated in the information processing apparatus 2 for sending printing data which requests printing of the data, such as a file, an image, or the like, prepared by using an application program, or the like, to the image forming apparatus 1. The information processing apparatus 2 adds authentication information to the printing data when sending the printing data for performing confidential printing to the image forming apparatus 1.

Figure 2:
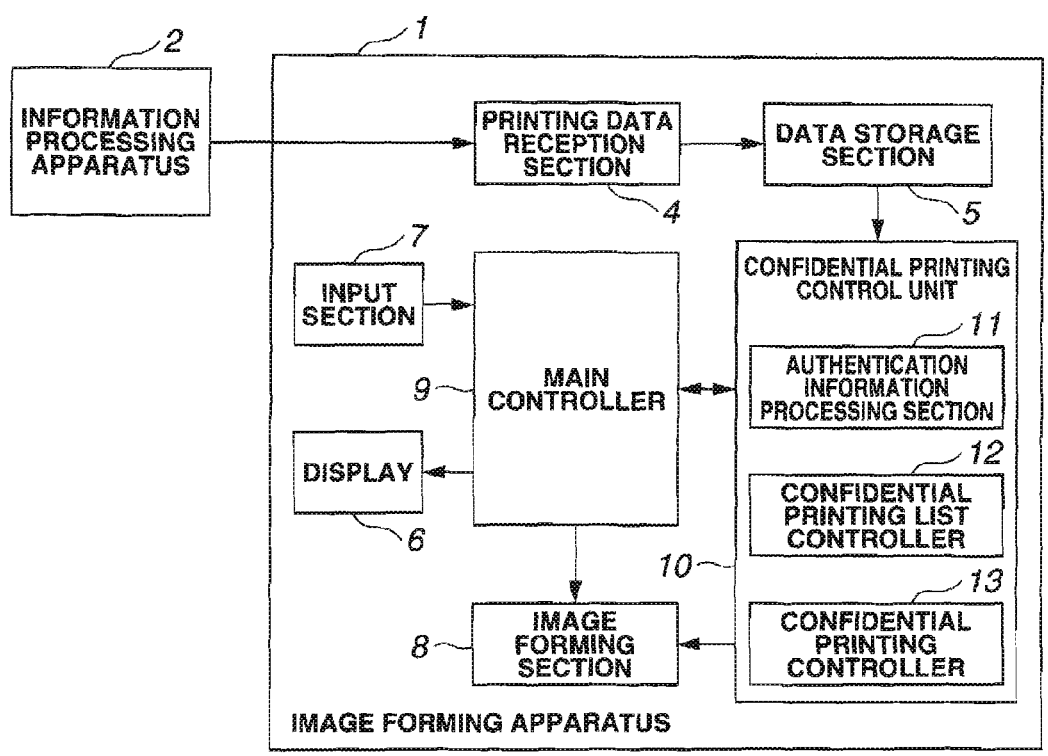
FIG. 2 is a block diagram showing one example of a functional configuration of an image forming apparatus.

FIG. 2 is a block diagram showing one example of the functional configuration of the image forming apparatus 1.

As shown in FIG. 2, the image forming apparatus 1 includes a printing data reception section 4, a data storage section 5, a display 6, an input section 7, an image forming section 8, a main controller 9, and a confidential printing control unit 10.

The printing data reception section 4 receives the printing data from the information processing apparatus 2 through the network 3.

When the printing data reception section 4 receives the printing data to which the authentication information is added, the data storage section 5 stores the printing data in the storage region in the memory, or the like, correlating the pertinent printing data to the pertinent authentication information. In addition, the data storage section 5 also stores authentication information for each user or each group and information about the processing operations which are executable by each particular user under authorization. There is no need for the image forming apparatus 1 incorporating the data storage section 5, and a configuration in which a storage apparatus for storing the printing data is installed on the network 3, and when confidential printing is to be performed, the pertinent printing data is acquired from the pertinent storage apparatus may be applied.

The display 6 is a display, or the like, which displays various types of information to be held forth to the user.

The input section 7 is a section from which the user inputs an instruction to the image forming apparatus 1, and is generally made up of hardware, such as a mouse, hard keys, and the like. The touch-panel scheme which combines the functions of the display 6 and the input section 7 may be adopted.

Herein, the authentication information which is to be used in performing confidential printing is inputted from the input section 7. An apparatus which reads the pertinent authentication information from a card-like storage medium storing the authentication information and carried by the user, such an apparatus as that which reads information about a living body feature of the user, such as a fingerprint, or the like, may be applied as the input section 7.

The image forming section 8 forms an image generated from the printing data on a sheet of paper.

While controlling the entire image forming apparatus 1, the main controller 9 carries out display control of the display 6; control of processing in response to an instruction based on a prescribed operation through the input section 7, and the like; and control of various functions for image forming processing to be carried out by the image forming section 8, and the like.

The confidential printing control unit 10 controls the confidential printing of the printing data stored in the data storage section 5, and as shown in FIG. 2, includes an authentication information processing section 11, a confidential printing list controller 12, and a confidential printing controller 13.

A configuration in which a printing control program including the above described confidential printing control unit 10 as a function is incorporated in a general-purpose image forming apparatus may also be applicable. In such a case, the printing control program is stored in the storage section (for example, a hard disk, or the like) of the image forming apparatus, and the computation section (for example, the CPU and the like) of the image forming apparatus executes the printing control program stored in the storage section. In addition, the printing control program may be stored in and provided from a storage medium, such as one of the various memories, an optical disk, and may also be distributed through a communications line, such as a network, or the like.

In a case where confidential printing is to be performed using the image forming apparatus 1 pertaining to the exemplary embodiment of the present invention, it is necessary to twice input the authentication information to the image forming apparatus 1.

Specifically, when the user who sends the printing data provided with authentication information for performing confidential printing from the information processing apparatus 2 to the image forming apparatus 1 inputs the authentication information for the first time (hereinafter to be referred to as the first authentication information) to the image forming apparatus 1, the image forming apparatus 1 displays a list of printing data on the basis of the first authentication information (hereinafter to be referred to as a confidential printing list). And, when the user selects the printing data for performing printing from the confidential printing list by inputting the authentication information for the second time (hereinafter to be referred to as the second authentication information), the image forming apparatus 1 performs confidential printing on the basis of the second authentication information.

Figure 3:
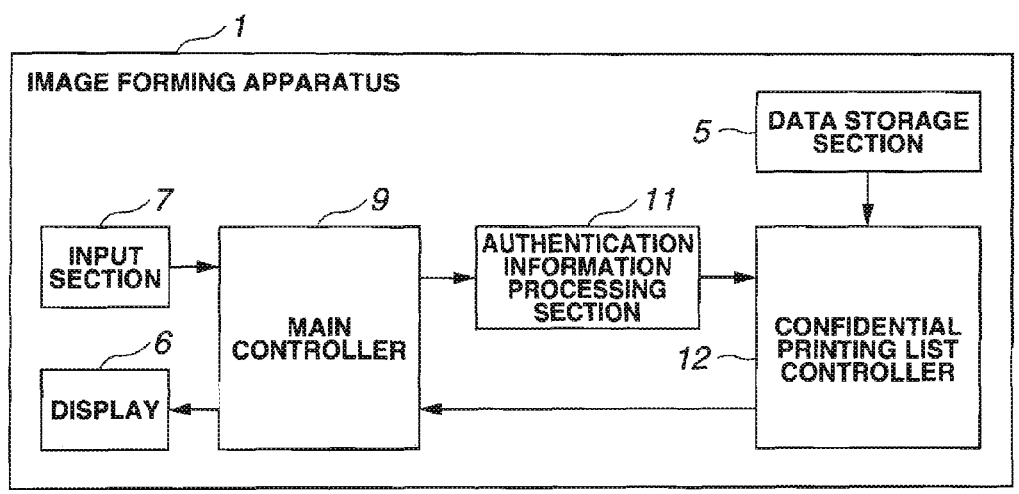
FIG. 3 is a diagram illustrating a functional operation of the image forming apparatus when a first authentication information is inputted.

Next, the functional operation of the image forming apparatus 1 when the first authentication information is inputted will be described with reference to FIG. 3.

When the first authentication information is inputted from the input section 7, the main controller 9 receives the first authentication information, and passes the first authentication information to the authentication information processing section 11. When receiving the first authentication information, the authentication information processing section 11 makes determination of whether the first authentication information is valid (hereinafter to be referred to as authentication processing), and in a case where the first authentication information is valid, the authentication information processing section 11 passes the first authentication information to the confidential printing list controller 12. At this time, the main controller 9 enables the functions other than the printing start function (for example, various functions for image forming processing to be carried out by the image forming section 8).

Upon receiving the first authentication information, the confidential printing list controller 12 reads the information about the printing data corresponding to the first authentication information from the printing data stored in the data storage section 5 in correlation to the authentication information for preparation of a confidential printing list to pass it to the main controller 9. Upon receiving the confidential printing list, the main controller 9 displays it on the display 6.

Figure 4:
FIG. 4 is a diagram showing one example of a confidential printing list.
Figure 5:
FIG. 5 is a diagram showing one example of the confidential printing list in the highlighted state.

FIG. 4 gives one example of the confidential printing list. From the confidential printing list, the user selects the printing data to be printed. For example, in a case where the display 6 is of touch-panel scheme, the desired printing data is selected by using a finger to touch the field for the printing data to be printed, and as shown in FIG. 5, the selected printing data field is displayed while being highlighted. A finger, or the like, is used to touch the "Print" button as shown in FIG. 5 to instruct the image forming apparatus 1 to start the printing of the selected printing data, and then second authentication information is inputted from the input section.

Figure 6:
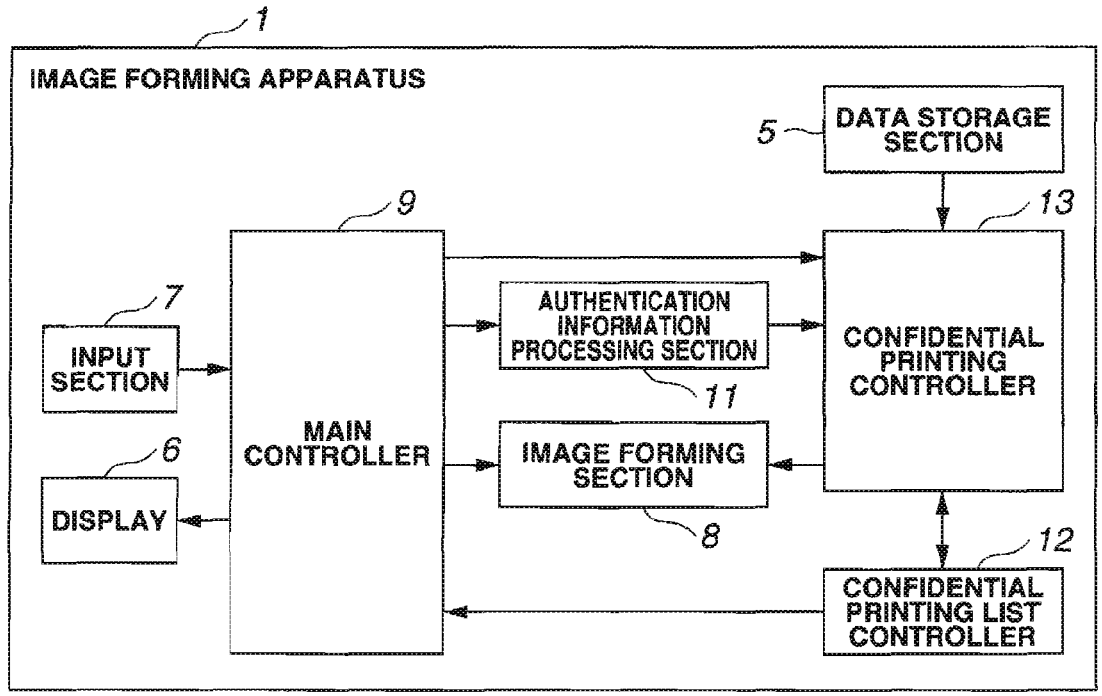
FIG. 6 is a diagram for explaining the functional operation of the image forming apparatus when a second authentication information is inputted.

Next, the functional operation of the image forming apparatus 1 when the second authentication information is inputted will be described with reference to FIG. 6.

When the second authentication information and a selection of the printing data to be printed are inputted from the input section 7, the main controller 9 receives the second authentication information and the selection, and passes the second authentication information to the authentication information processing section 11, while passing the selection to the confidential printing controller 13. Upon receiving the second authentication information, the authentication information processing section 11 carries out authentication processing of the second authentication information. In a case where it is determined that the second authentication information is valid, the authentication information processing section 11 passes the second authentication information to the confidential printing controller 13. Upon receiving the second authentication information from the authentication information processing section 11 and the selection from the main controller 9, the confidential printing controller 13 reads the printing data for the selection from the printing data stored in the data storage section 5. In a case where the pertinent selected printing data is included in the printing data printable on the basis of the second information, the confidential printing controller 13 passes the pertinent printing data to the image forming section 8. Upon receiving the pertinent printing data, the image forming section 8 forms an image generated from the pertinent printing data on the sheet of paper.

Figure 7:
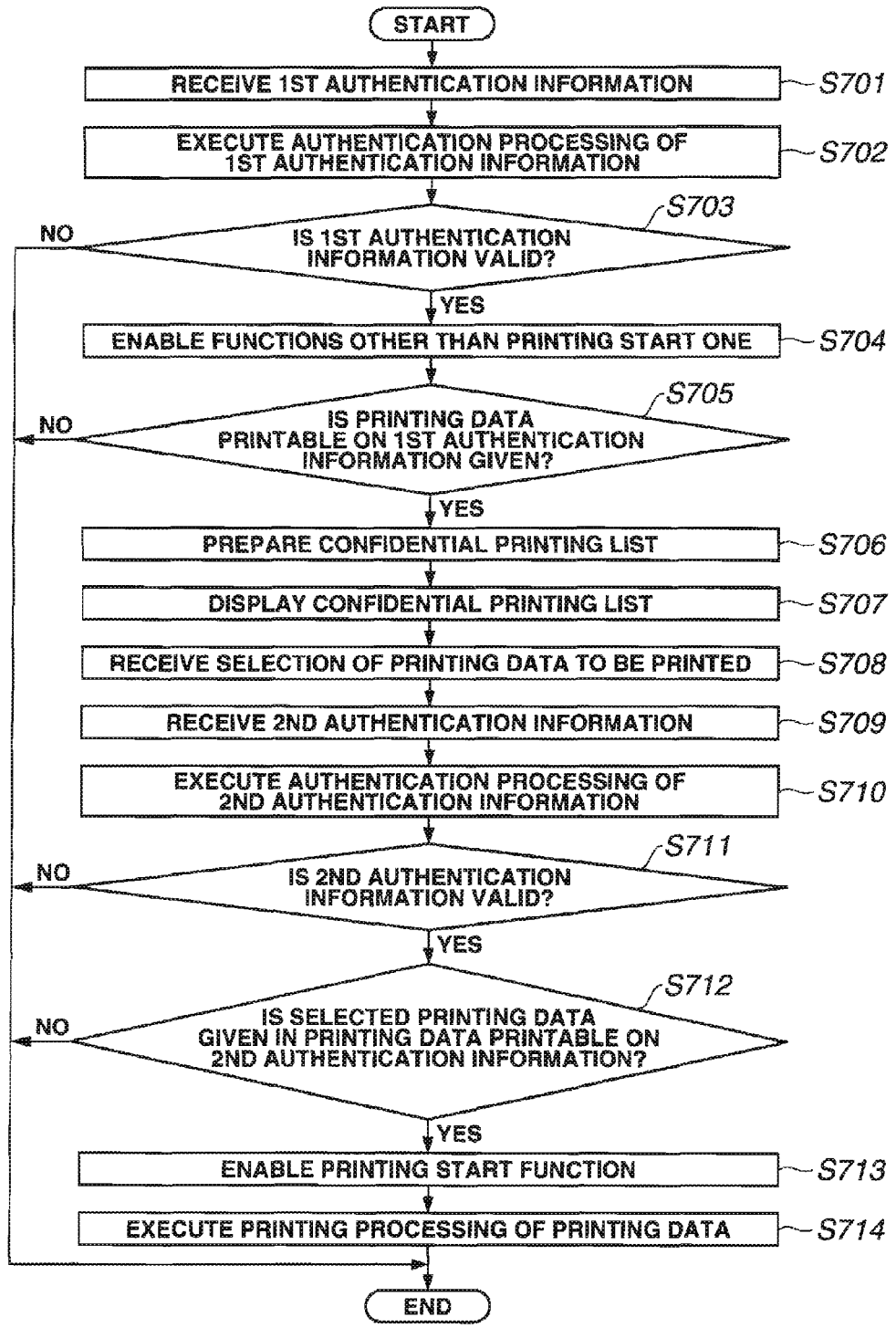
FIG. 7 is a flowchart illustrating one example of a flow of processing which is carried out by the image forming apparatus.

Next, one example of the flow of processing which is carried out by the image forming apparatus 1 will be described with reference to a flowchart as shown in FIG. 7.

Upon receiving the first authentication information (S701), the authentication information processing section executes authentication processing of the first authentication information (S702); in a case where the first authentication information is valid (YES at S703), the program proceeds to S704; and in a case where the first authentication information is invalid (NO at S703), the processing procedure is terminated.

In a case where the first authentication information is valid (YES at S703), the main controller enables the functions other than the printing start function (S704); the confidential printing list controller determines whether in the printing data storage section, the printing data printable on the basis of the first authentication information is given (S705); in a case where the printing data printable on the basis of the first authentication information is given (YES at S705), the program proceeds to S806; and in a case where the printing data printable on the basis of the first authentication information is not given (NO at S705), the processing procedure is terminated.

In a case where the printing data printable on the basis of the first authentication information is given (YES at S705), the confidential printing list controller prepares a confidential printing list (S706), and the main controller displays the confidential printing list on the display (S707).

And, the confidential printing controller receives a selection of the printing data to be printed (S708); the authentication information processing section receives the second authentication information (S709); the authentication information processing section executes authentication processing of the second authentication information (S710); in a case where the second authentication information is valid (YES at S711), the program proceeds to S712; and in a case where the second authentication information is invalid (NO at S711), the processing procedure is terminated.

In a case where the second authentication information is valid (YES at S711), the confidential printing controller reads the printing data selected at S708; in a case where the printing data selected at S708 is included in the printing data printable on the basis of the second authentication information (YES at S712), the program proceeds to S713; and in a case where the printing data selected at S708 is not included in the printing data printable on the basis of the second authentication information (NO at S712), the processing procedure is terminated.

In a case where the printing data selected at S708 is included in the printing data printable on the basis of the second authentication information (YES at S712), the main controller enables the printing start function (S713); and the image forming section executes printing processing of the printing data (S714), and the processing procedure is terminated. The exemplary embodiment of the present invention may have a configuration in which, after the printing process is terminated, the image forming apparatus is returned to the state where the printing start function is disabled while the functions other than the printing start function is enabled. The exemplary embodiment of the present invention may also have a configuration in which the image forming apparatus is returned to the state before the authentication processing of the first authentication information is carried out.

Additionally, in a case where, after the selection of the printing data, the second authentication information is inputted without explicitly starting the printing out of the printing data, it may be determined that the instruction for starting the printing is given.

Figure 8:
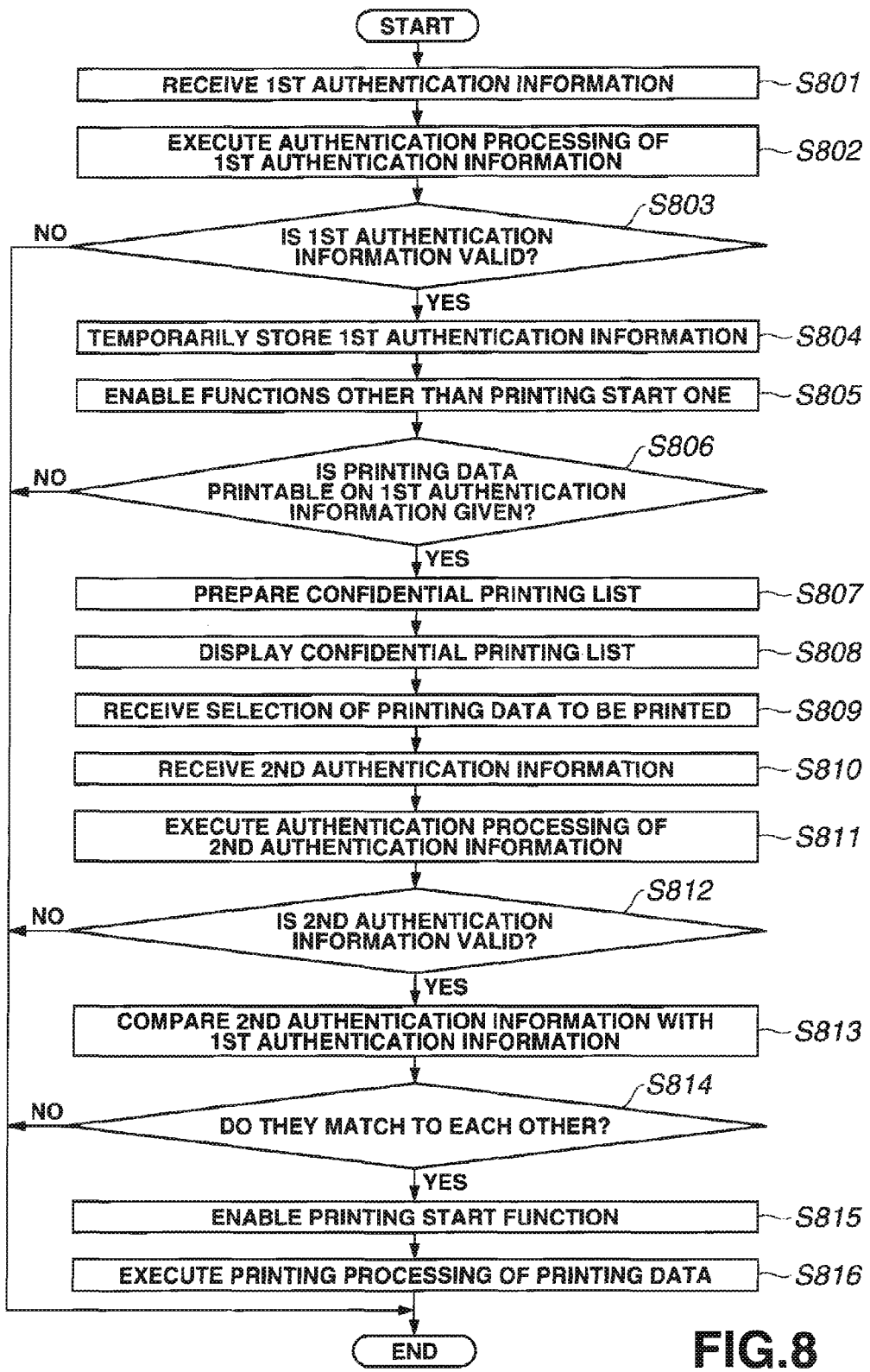
FIG. 8 is a flowchart illustrating one example of the flow of processing which is carried out by the image forming apparatus in a case where a configuration in which the first authentication information and the second authentication information are compared with each other is applied.

Additionally, in a case where the image forming processing is carried out, the user who inputs the second authentication information may be charged a fee by accumulating log of the image forming processing in correspondence with the second authentication information, Next, one example of the flow of processing which is carried out by the image forming apparatus 1 in a case where a configuration in which the first authentication information is compared with the second authentication information will be described with reference to a flowchart as shown in FIG. 8.

Upon receiving the first authentication information (S801), the authentication information processing section executes authentication processing of the first authentication information (S802); in a case where the first authentication information is valid (YES at S803), the program proceeds to S804; and in a case where the first authentication information is invalid (NO at S803), the processing procedure is terminated.

In a case where the first authentication information is valid (YES at S803), the authentication information processing section temporarily stores the first authentication information (S804); the main controller enables the functions other than the printing start function (S805); the confidential printing list controller determines whether, in the printing data storage section, the printing data printable on the basis of the first authentication information is given (S806); in a case where the printing data printable on the basis of the first authentication information is given (YES at S806), the program proceeds to S807; and in a case where the printing data printable on the basis of the first authentication information is not given (NO at S806), the processing procedure is terminated.

In a case where the printing data corresponding to the first authentication information is given (YES at S806), the confidential printing list controller prepares a confidential printing list (S807), and the main controller displays the confidential printing list on the display (S808).

And, the confidential printing controller receives a selection of the printing data to be printed (S809), the authentication information processing section receives the second authentication information (S810); the authentication information processing section executes authentication processing of the second authentication information (S811); in a case where the second authentication information is valid (YES at S811), the program proceeds to S813; and in a case where the second authentication information is invalid (NO at S812), the processing procedure is terminated.

In a case where the second authentication information is valid (YES at S812), the first authentication information which is temporarily stored in the confidential printing controller is compared with the second authentication information (S813); in a case where both pieces of authentication information match to each other (YES at S814), the program proceeds to S815; and in a case where both pieces of authentication information do not match to each other (NO at S814), the processing procedure is terminated.

In a case where both pieces of authentication information match to each other (YES at S814), the main controller enables the printing start function (S815), the image forming section executes printing processing of the printing data (S816), the processing procedure being terminated. The exemplary embodiment of the present invention may have a configuration in which, after the printing process is terminated, the image forming apparatus is returned to the state after the authentication processing of the first authentication information is completed, in other words, the state where the printing start function is disabled while the functions other than the printing start function is enabled. The exemplary embodiment of the present invention may also have a configuration in which the image forming apparatus is returned to the state before the authentication processing of the first authentication information is carried out.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
a printing data reception section that receives printing data through a communication section;
a printing data storage section that stores the printing data received by the printing data reception section and authentication information added to the printing data in association with each other;
a printing section that prints the printing data on a printing medium;
an information reception section that receives first information;
a matching section that matches the first information received by the information reception section with the authentication information added to the printing data;
a retrieval section that retrieves from the printing data storage section the printing data processable on the basis of the first information matched by the matching section;
a presentation section that provides a list of the printing data retrieved by the retrieval section; and
a permission section that, in a case where, while the list of printing data is being provided by the presentation section, the print data reception section receives an instruction to print the printing data on the printing medium and second information, and the instructed printing data is included in the printing data processable on the basis of the second information matched by the matching section, permits printing of the instructed printing data on the printing medium, wherein
the printing start function is disabled until it is determined that the instructed printing data is included in the printing data processable on the basis of the second information, and
following the permission section permitting printing of the instructed printing data on the printing medium, the printing start function is disabled, the presentation section again provides the list of the printing data processable on the basis of the first information matched by the matching section and the print data reception section receives a new printing instruction to print the printing data, and when the information reception section receives the new printing instruction and the second information, the permission section permits printing of newly instructed printing data on the printing medium.

2. An image forming apparatus, comprising:
a printing data reception section that receives printing data through a communication section;
a printing data storage section that stores the printing data received by the printing data reception section and authentication information added to the printing data in association with each other;
a printing section that prints the printing data on a printing medium;
an information reception section that receives first information;
a matching section that matches the first information received by the information reception section with the authentication information added to the printing data;
a retrieval section that retrieves from the printing data storage section the printing data processable on the basis of the first information matched by the matching section;
a presentation section that provides a list of the printing data retrieved by the retrieval section;
a comparison section that, in a case where, while the list of printing data is being provided by the presentation section, the reception section receives instruction to print the printing data on the printing medium and second information, compares the first information with the second information; and
a permission section that, in a case where the first information and the second information compared with each other by the comparison section match to each other, permits printing of the printing data on the printing medium, wherein
the printing start function is disabled until the first information matches the second information, and
following the permission section permitting printing of the instructed printing data on the printing medium, the printing start function is disabled and the presentation section again provides the list of the printing data processable on the basis of first information matched by the matching section and the reception section receives a new printing instruction to print the printing data, and when the information reception section receives the new printing instruction and the second information, the permission section permits printing of newly instructed printing data on the printing medium.

3. An image forming method, comprising:
receiving printing data through a communication section;
storing the received printing data and authentication information added to the printing data in association with each other;
printing the printing data on a printing medium;
receiving first information;
matching the received first information with the authentication information;
retrieving the printing data processable on the basis of matched first information;
providing a list of the retrieved printing data; and
in a case where, while the list of printing data is being provided, an instruction to print the printing data on the printing medium and second information are received, and the instructed printing data is included in the printing data processable on the basis of the matched second information, permitting printing of the instructed printing data on the printing medium, wherein
the printing start function is disabled until it is determined that the instructed printing data is included in the printing data processable on the basis of the second information, and following the permitting of printing of the instructed printing data on the printing medium, the printing start function is disabled, the list of the printing data processable on the basis of matched first information is again provided and a new printing instruction to print the printing data is received, and when the new printing instruction and the second information are received, permitting printing of newly instructed printing data on the printing medium.

4. A non-transitory computer readable recording medium storing a printing control program for causing a computer to execute a process, the process comprising:
- receiving printing data through a communication section;
- storing the received printing data and authentication information added to the printing data in association with each other;
- receiving first information;
- matching the received first information with the authentication information;
- retrieving the printing data processable on the basis of matched first information;
- providing a list of the retrieved printing data; and
- in a case where, while the list of printing data is being provided, an instruction to print the printing data on the printing medium and second information are received, and the instructed printing data is included in the printing data processable on the basis of the second information, permitting printing of the instructed printing data on the printing medium, wherein
- the printing start function is disabled until it is determined that the instructed printing data is included in the printing data processable on the basis of the second information, and
- following the permitting of printing of the instructed printing data on the printing medium, the printing start function is disabled, the list of the printing data processable on the basis of matched first information is again provided and a new printing instruction to print the printing data is received, and when the new printing instruction and the second information are received, permitting printing of newly instructed printing data on the printing medium.

5. A non-transitory computer readable recording medium storing a printing control program for causing a computer to execute a process, the process comprising:
- receiving printing data through a communication section;
- storing the received printing data and authentication information added to the printing data in association with each other;
- receiving first information;
- matching the first information received with the authentication information;
- retrieving the printing data processable on the basis of matched first information;
- providing a list of the retrieved printing data;
- in a case where, while the list of printing data is being provided, an instruction to print the printing data on the printing medium and second information are received, comparing the first information with the second information; and
- in a case where the first information and the second information compared with each other match to each other, permitting printing of the printing data on the printing medium, wherein
- the printing start function is disabled until the first information matches the second information, and following the permitting of printing of the instructed printing data on the printing medium, the printing start function is disabled, the list of the printing data processable on the basis of matched first information is again provided and a new printing instruction to print the printing data is received, and when the new printing instruction and the second information are received, permitting printing of newly instructed printing data on the printing medium.

6. An image forming apparatus, comprising:
- a printing data reception section that receives printing data for confidential printing through a communication section;
- a printing data storage section that stores, in association with the printing data received by the printing data reception section, added information which comprises first added information for authentication of a user who is permitted to perform confidential printing of printing data received by the printing data reception section and second added information for determining whether or not to permit printing out on a printing medium in case of confidential printing of the printing data;
- a printing section that prints the printing data on the printing medium;
- an information reception section that receives first input information for user authentication, an instruction to select printing data for the confidential printing and second input information for getting permission for the confidential printing out on the printing medium;
- an authentication section that performs the user authentication based on the first input information received by the information reception section;
- a presentation section that, when the user is authenticated by the authentication section, matches the first input information and the first added information added to the printing data according to each printing data, retrieves printing data processable for the confidential printing to the user authenticated by the authentication section and, in a case where the printing data processable for the confidential printing by the user authenticated by the authentication section is retrieved, provides a list of the retrieved printing data and disables the function of printing out on the printing medium;
- a matching section that, while the list of the printing data provided by the presentation section is being displayed, when the instruction to select the printing data and the second input information are received by the information reception section, matches the second added information associated with the printing data instructed to be selected and the second input information received by the information reception section, and determines whether or not to permit printing out on the printing medium based on the printing data instructed to be selected; and
- a permission section that, in a case where the matching section permits the printing out on the printing medium, enables the function of printing out, instructs the printing section to print out on the printing medium based on the printing data instructed to be selected by the information reception section, and, when the instructed printing is finished, disables the function of printing out on the printing medium again and instructs the presentation section again to provide the printing data processable to the user authenticated by the authentication section.

7. The image forming apparatus of claim 6, wherein the first input information is a user name, a name of a group which a user belongs to, or a password for authentication, and the second input information is a password for printing out.

8. An image forming method, comprising:
receiving, by a printing data reception section, printing data for confidential printing through a communication section;
storing, by a printing data storage section, in association with the printing data received by the printing data reception section, added information which comprises first added information for authentication of a user who is permitted to perform confidential printing of printing data received by the printing data reception section and second added information for determining whether or not to permit printing out on a printing medium in case of confidential printing of the printing data;
receiving, by an information reception section, first input information for user authentication, an instruction to select printing data for the confidential printing and second input information for getting permission for the confidential printing out on the printing medium;
performing, by an authentication section, the user authentication based on the first input information received by the information reception section;
when the user is authenticated by the authentication section, matching the first input information and the first added information added to the printing data according to each printing data, retrieving printing data processable for the confidential printing to the user authenticated by the authentication section and, in a case where the printing data processable for the confidential printing by the user authenticated by the authentication section is retrieved, providing a list of the retrieved printing data and disabling the function of printing out on the printing medium, by a presentation section;
while the list of the printing data provided by the presentation section is being displayed, when the instruction to select the printing data and the second input information are received by the information reception section, matching the second added information associated with the printing data instructed to be selected and the second input information received by the information reception section, and determining whether or not to permit printing out on the printing medium based on the printing data instructed to be selected, by a matching section; and
in a case where the matching section permits the printing out on the printing medium, enabling the function of printing out, instructing the printing section that prints the printing data on the printing medium to print out on the printing medium based on the printing data instructed to be selected by the information reception section, and, when the instructed printing is finished, disabling the function of printing out on the printing medium again and instructing the presentation section again to provide the printing data processable to the user authenticated by the authentication section, by a permission section.

9. The image forming method of claim 8, wherein the first input information is a user name, a name of a group which a user belongs to, or a password for authentication, and the second input information is a password for printing out.

10. A non-transitory computer readable medium storing a control program for causing a computer to execute a process, the process comprising:
a step of receiving, by a printing data reception section, printing data for confidential printing through a communication section;
a step of storing, by a printing data storage section, in association with the printing data received by the printing data reception section, added information which comprises first added information for authentication of a user who is permitted to perform confidential printing of printing data received by the printing data reception section and second added information for determining whether or not to permit printing out on a printing medium in case of confidential printing of the printing data;
a step of receiving, by an information reception section, first input information for user authentication, an instruction to select printing data for the confidential printing and second input information for getting permission for the confidential printing out on the printing medium;
a step of performing, by an authentication section, the user authentication based on the first input information received by the information reception section;
when the user is authenticated by the authentication section, a step of
matching the first input information and the first added information added to the printing data according to each printing data,
retrieving printing data processable for the confidential printing to the user authenticated by the authentication section and,
in a case where the printing data processable for the confidential printing by the user authenticated by the authentication section is retrieved, providing a list of the retrieved printing data and disabling the function of printing out on the printing medium, by a presentation section;
while the list of the printing data provided by the presentation section is being displayed, when the instruction to select the printing data and the second input information are received by the information reception section, a step of matching the second added information associated with the printing data instructed to be selected and the second input information received by the information reception section, and determining whether or not to permit printing out on the printing medium based on the printing data instructed to be selected, by a matching section; and
in a case where the matching section permits the printing out on the printing medium, a step of
enabling the function of printing out,
instructing the printing section that prints the printing data on the printing medium to print out on the printing medium based on the printing data instructed to be selected by the information reception section, and,
when the instructed printing is finished, disabling the function of printing out on the printing medium again and instructing the presentation section again to provide the printing data processable to the user authenticated by the authentication section, by a permission section.

11. The non-transitory computer readable medium of claim 10, wherein the first input information is a user name, a name of a group which a user belongs to, or a password for authentication, and the second input information is a password for printing out.

* * * * *